United States Patent
Tooher et al.

(10) Patent No.: US 10,348,475 B2
(45) Date of Patent: Jul. 9, 2019

(54) WIRELESS TRANSMIT/RECEIVE UNIT (WTRU)-CENTRIC TRANSMISSION

(71) Applicant: IDAC HOLDINGS, INC., Wilmington, DE (US)

(72) Inventors: J. Patrick Tooher, Montreal (CA); Paul Marinier, Brossard (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/761,851

(22) PCT Filed: Sep. 23, 2016

(86) PCT No.: PCT/US2016/053356
§ 371 (c)(1),
(2) Date: Mar. 21, 2018

(87) PCT Pub. No.: WO2017/053738
PCT Pub. Date: Mar. 30, 2017

(65) Prior Publication Data
US 2019/0074953 A1    Mar. 7, 2019

Related U.S. Application Data

(60) Provisional application No. 62/222,516, filed on Sep. 23, 2015.

(51) Int. Cl.
*H04B 7/06* (2006.01)
*H04L 5/00* (2006.01)
(Continued)

(52) U.S. Cl.
CPC ......... *H04L 5/0073* (2013.01); *H04B 7/0617* (2013.01); *H04B 7/0626* (2013.01);
(Continued)

(58) Field of Classification Search
USPC .......................................... 375/262; 370/329
See application file for complete search history.

(56) References Cited

U.S. PATENT DOCUMENTS

| 2011/0070845 | A1* | 3/2011 | Chen | ...................... H04L 5/001 455/91 |
| 2013/0100905 | A1* | 4/2013 | Pan | ...................... H04B 7/0417 370/329 |

(Continued)

FOREIGN PATENT DOCUMENTS

| EP | 2816831 A1 | 12/2014 |
| WO | WO 2016/021969 A1 | 2/2016 |

OTHER PUBLICATIONS

3rd Generation Partnership Project (3GPP), RWS-150006, "Vision on 5G Radio Access Technologies", Huawei Technologies, 3GPP RAN Workshop on 5G, Phoenix, USA, Sep. 17-18, 2015, 18 pages.

(Continued)

*Primary Examiner* — Eva Y Puente
(74) *Attorney, Agent, or Firm* — Condo Roccia Koptiw LLP

(57) ABSTRACT

WTRU-Centric Transmission is disclosed. A WTRU may communicate using a set of WTRU-specific cell IDs (WC-IDs). A WTRU may be configured with a WCID and/or set of WCIDs, for example, by a serving cell and/or eNB and/or by autonomous selection. A WTRU may be configured with and/or may use one or more WCIDs, for example, based on a resource, channel, subband, time, subframe, signal type, transmission type, function (e.g. sequence generation), service type, etc. A WTRU may indicate its presence by transmitting a WTRU presence indicator, e.g., to enable a network to send appropriate transmissions using one or more WTRU WCIDs. Resources for measurements and/or reporting, e.g., for channel state information (CSI) processes, may be dynamically controlled. A WTRU may be dynamically (Continued)

reconfigured (e.g. without radio resource control (RRC) transmissions) to adapt WTRU-centric communication to changing sets of cooperating transmission points.

20 Claims, 10 Drawing Sheets

(51) Int. Cl.
  *H04W 48/16* (2009.01)
  *H04W 76/11* (2018.01)
  *H04L 27/26* (2006.01)
(52) U.S. Cl.
  CPC .......... *H04L 5/0035* (2013.01); *H04L 5/0057* (2013.01); *H04L 27/2605* (2013.01); *H04W 48/16* (2013.01); *H04W 76/11* (2018.02)

(56) References Cited

U.S. PATENT DOCUMENTS

| | | |
|---|---|---|
| 2014/0185480 A1 | 7/2014 | Lee et al. |
| 2015/0003263 A1 | 1/2015 | Senarath et al. |
| 2015/0141002 A1 | 5/2015 | Ma et al. |
| 2016/0142163 A1 | 5/2016 | Sirotkin |
| 2017/0208519 A9* | 7/2017 | Shaheen ............... H04W 36/14 |
| 2018/0020441 A1* | 1/2018 | Lo .......................... H04W 76/14 |
| 2018/0103501 A1* | 4/2018 | Pani ..................... H04W 72/042 |
| 2018/0234136 A1* | 8/2018 | Marinier ................ H04B 7/024 |

OTHER PUBLICATIONS

3rd Generation Partnership Project (3GPP), RWS-150012, "5G Views on Technology & Standardization", Qualcomm, 3GPP RAN Workshop on 5G Phoenix, USA, Sep. 2015, 21 pages.

3rd Generation Partnership Project (3GPP), RWS-150024, "Considerations on 5G Key Technologies & Standardization", ZTE, Sep. 2015, 18 pages.

3rd Generation Partnership Project (3GPP), RWS-150069, "Initial Views on 5G Technologies—from Terminal Perspectives", Shenzhen Coolpad Technologies, 3GPP RAN Workshop on 5G Phoenix, AZ, USA, Sep. 17-18, 2015, 15 pages.

3rd Generation Partnership Project (3GPP), TR 36.819 V11.2.0, "Technical Specification Group Radio Access Network, Coordinated Multi-Point Operation for LTE Physical Layer Aspects (Release 11)", Sep. 2009, 70 pages.

* cited by examiner

WIRELESS TRANSMIT/RECEIVE UNIT (WTRU)-CENTRIC TRANSMISSION

CROSS-REFERENCE TO RELATED APPLICATIONS

This application is the National Stage Entry under 35 U.S.C. § 371 of Patent Cooperation Treaty Application No. PCT/US2016/053356, filed Sep. 23, 2016, which claims the benefit of U.S. Provisional Patent Application No. 62/222,516, filed Sep. 23, 2015, the contents of all of which being incorporated by reference as if fully set-forth herein in their respective entirety, for all purposes.

BACKGROUND

In a wireless communication network, such as a Long Term Evolution (LTE) system, a wireless transmit/receive unit (WTRU) may report to the network measurements on one or more, or all, transmission points in an area. However, such reporting may have large feedback overhead, e.g., when one or more, or multiple WTRUs share similar transmission and/or reception points. Feedback overhead may use large amounts of resources in such systems, may reduce system throughput, and/or consume WTRU battery life. For example, WTRUs may report feedback to support transmission and/or reception to a subset of transmission and/or reception points. In such scenarios, and/or others, large overhead for configuration and/or reconfiguration of the subsets may be useful, especially in the case of mobile WTRUs.

SUMMARY

Systems, methods, and/or instrumentalities are disclosed for WTRU-Centric Transmission. A WTRU may communicate using a set of WTRU-specific cell IDs (WCID, and/or UE-specific cell IDs, UCIDs). A WTRU may be configured with a WCID and/or set of WCIDs, for example, by a serving cell and/or eNB, and/or by autonomous selection. A WTRU may be configured with and/or may use one or more WCIDs, for example, based on one or more of: a resource, channel, subband, time, subframe, signal type, transmission type, function (e.g. sequence generation), and/or service type, etc. A WTRU may indicate its presence, for example by transmitting a WTRU presence indicator, e.g., to enable a network to send appropriate transmissions using one or more WTRU WCIDs. Resources for measurements and/or reporting, e.g., for channel state information (CSI) processes, may be dynamically controlled. A WTRU may be dynamically reconfigured (e.g. without radio resource control (RRC) transmissions) to adapt WTRU-centric communication to changing sets of cooperating transmission points. A WTRU may have one or more, or multiple, sets of uplink (UL) power control parameters, e.g., dynamically indicated resource and/or per WCID. A WTRU may dynamically indicate one or more sets (e.g. an optimal set) of points that may cooperate for the WTRU. A WTRU may request and/or trigger system information from a transmission point.

A wireless transmit/receive unit (WTRU) may comprise a memory, a processor, and/or a transceiver. The processor may be configured to detect one or more transmission points within a communication range of the WTRU. The processor may be configured to determine at least one WTRU-specific cell identifier (WCID) based on detecting the one or more transmission points. The processor may be configured to determine one or more resources via which to indicate the at least one WCID. The processor may be configured to determine an occurrence of at least one condition. The processor may be configured to initiate a transmission upon the occurrence of the at least one condition. The transmission may indicate the at least one WCID. The transceiver may be configured to send the transmission using the one or more resources.

A wireless transmit/receive unit (WTRU) may comprise a memory, a processor, and/or a transceiver. The processor may be configured with one or more Channel State Information (CSI) Processes. The processor may be configured with one or more feedback resources. The processor may be configured to determine at least one of: a ranking of the one or more CSI Processes, and/or an occurrence of a condition of use of at least one of the one or more feedback resources. The processor may be configured to map a number of the one or more CSI Processes to the at least one of the one or more feedback resources based on at least one of: the ranking of the one or more CSI Processes, and/or the occurrence of the condition of use of the at least one of the one or more feedback resources. The processor may be configured to initiate a feedback report of at least one of the one or more CSI Processes. The transceiver may be configured to send the feedback report of the at least one CSI Process of the one or more CSI Processes using a mapped feedback resource of the one or more feedback resources.

A wireless transmit/receive unit (WTRU) may comprise a memory, a processor, and/or a transceiver. The processor may be configured with one or more Channel State Information (CSI) Processes. The processor may be configured with one or more reporting resources. The processor may be configured with one or more periodic reporting configurations. One or more, or each, of the one or more periodic reporting configurations may include one or more periodic reporting instances. The processor may be configured to initiate at least one measurement of at least one of the one or more CSI Processes associated with at least one of the one or more periodic reporting configurations. The processor may be configured to determine an occurrence of at least one event corresponding to the at least one of the one or more periodic reporting configurations. The transceiver may be configured to send, in at least one of the one or more periodic reporting instances upon the occurrence of the event, at least one of: the at least one CSI Process corresponding to the at least one periodic reporting configuration, and/or the at least one measurement in at least one feedback report of the at least one CSI Process corresponding to the at least one periodic reporting configuration.

DETAILED DESCRIPTION

A detailed description of illustrative embodiments will now be described with reference to the various figures. Although this description provides a detailed example of possible implementations, it should be noted that the details are intended to be examples and in no way limit the scope of the application.

Figure 1A:
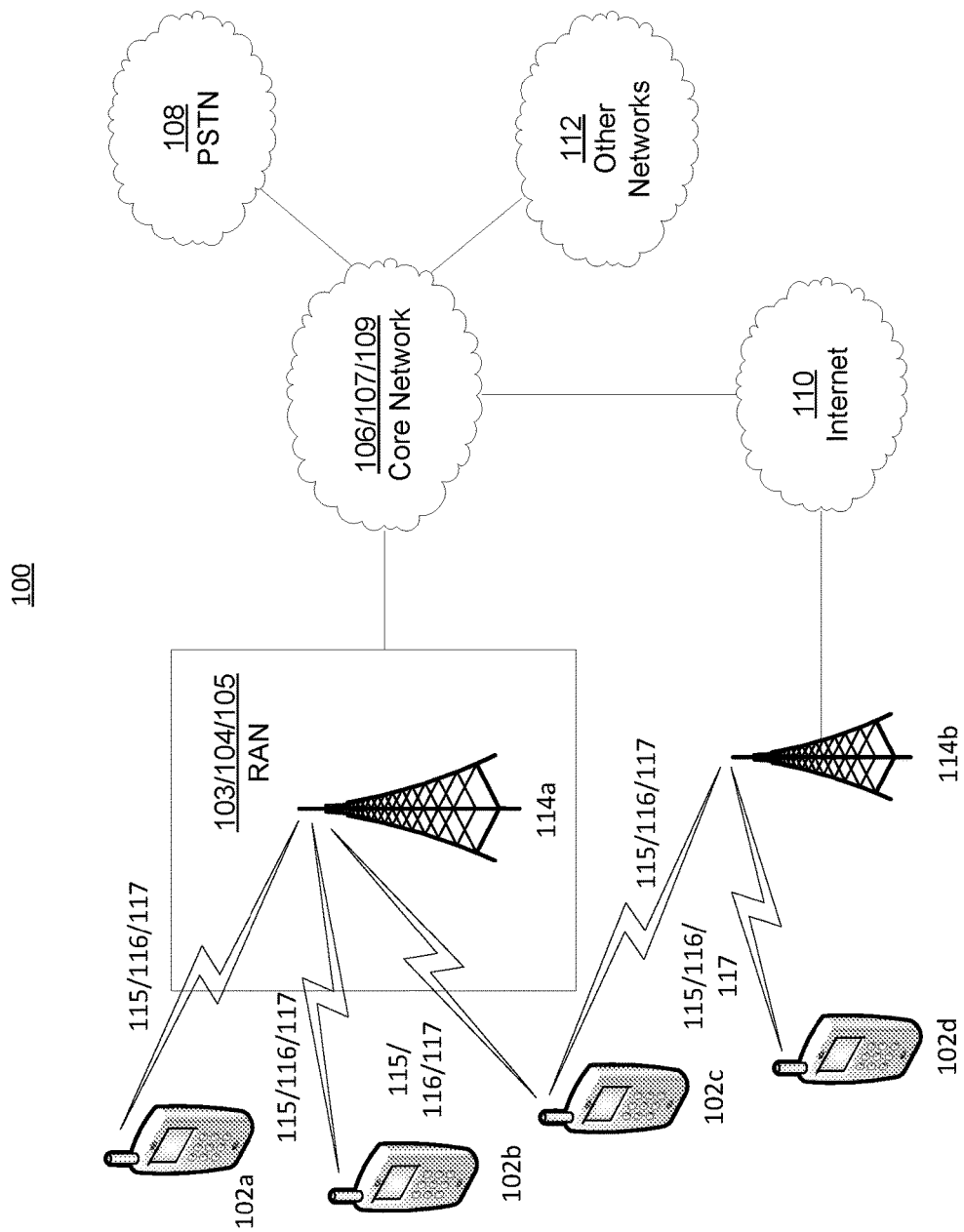
FIG. 1A is a system diagram of an example communications system in which disclosed subject matter may be implemented.

FIG. 1A is a diagram of an example communications system 100 in which one or more disclosed embodiments may be implemented. The communications system 100 may be a multiple access system that provides content, for example voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, for example code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include a user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, for example the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), for example a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g. radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, for example CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, for example a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g. WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, for example user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, for example the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
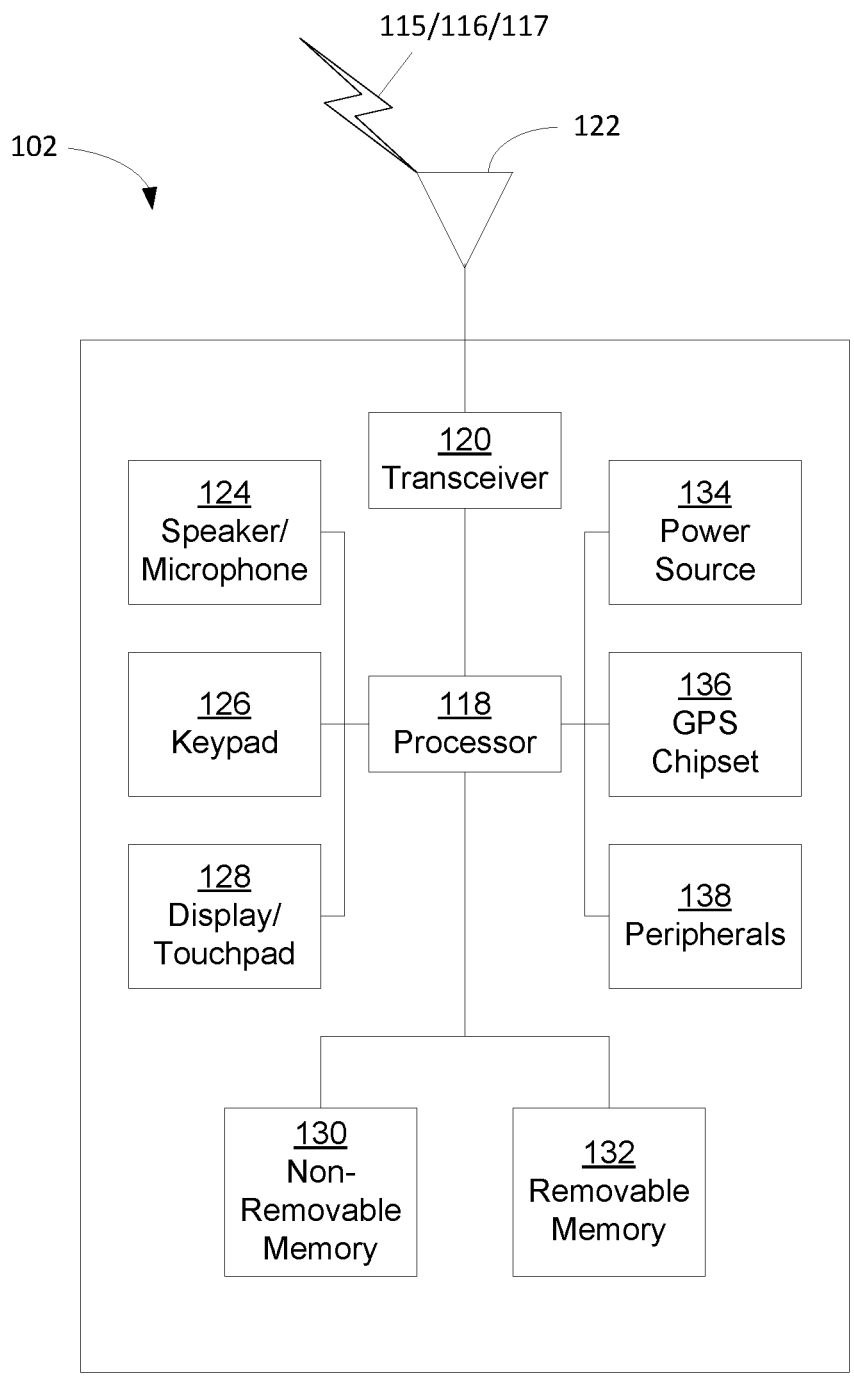
FIG. 1B is a system diagram of an example wireless transmit/receive unit (WTRU) that may be used in a communications system.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, for example but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example UTRA and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, for example the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, for example on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 115/116/117 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
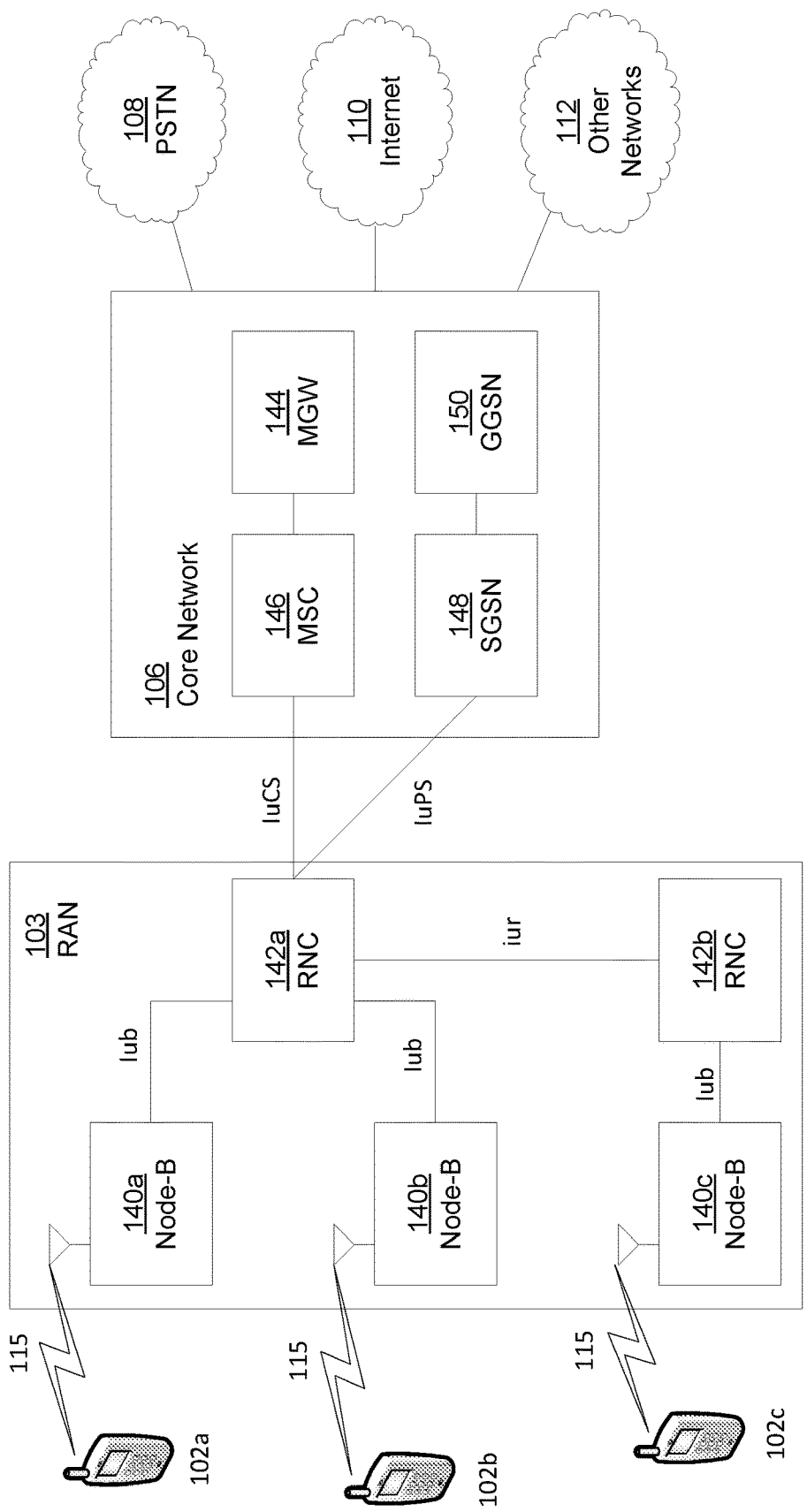
FIG. 1C is a system diagram of an example radio access network and an example core network that may be used in a communications system.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, for example outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, for example the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, for example the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
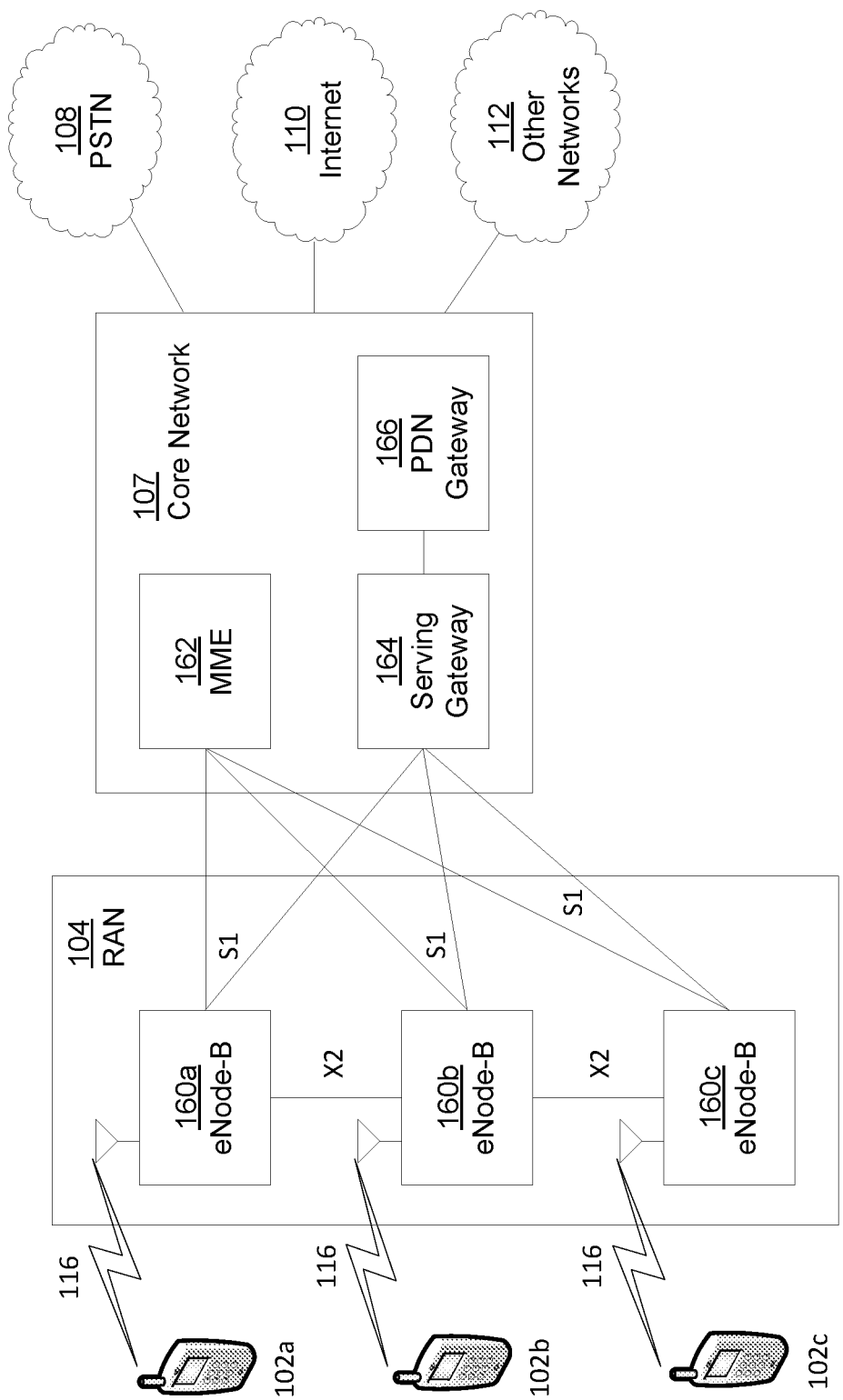
FIG. 1D is a system diagram of an example radio access network and an example core network that may be used in a communications system.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, for example GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, for example anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, for example the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, for example the PSTN 108, to facilitate communications between the WTRUs 102a, 102b, 102c and traditional land-line communications devices. For example, the core network 107 may include, or may communicate with, an IP gateway (e.g. an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
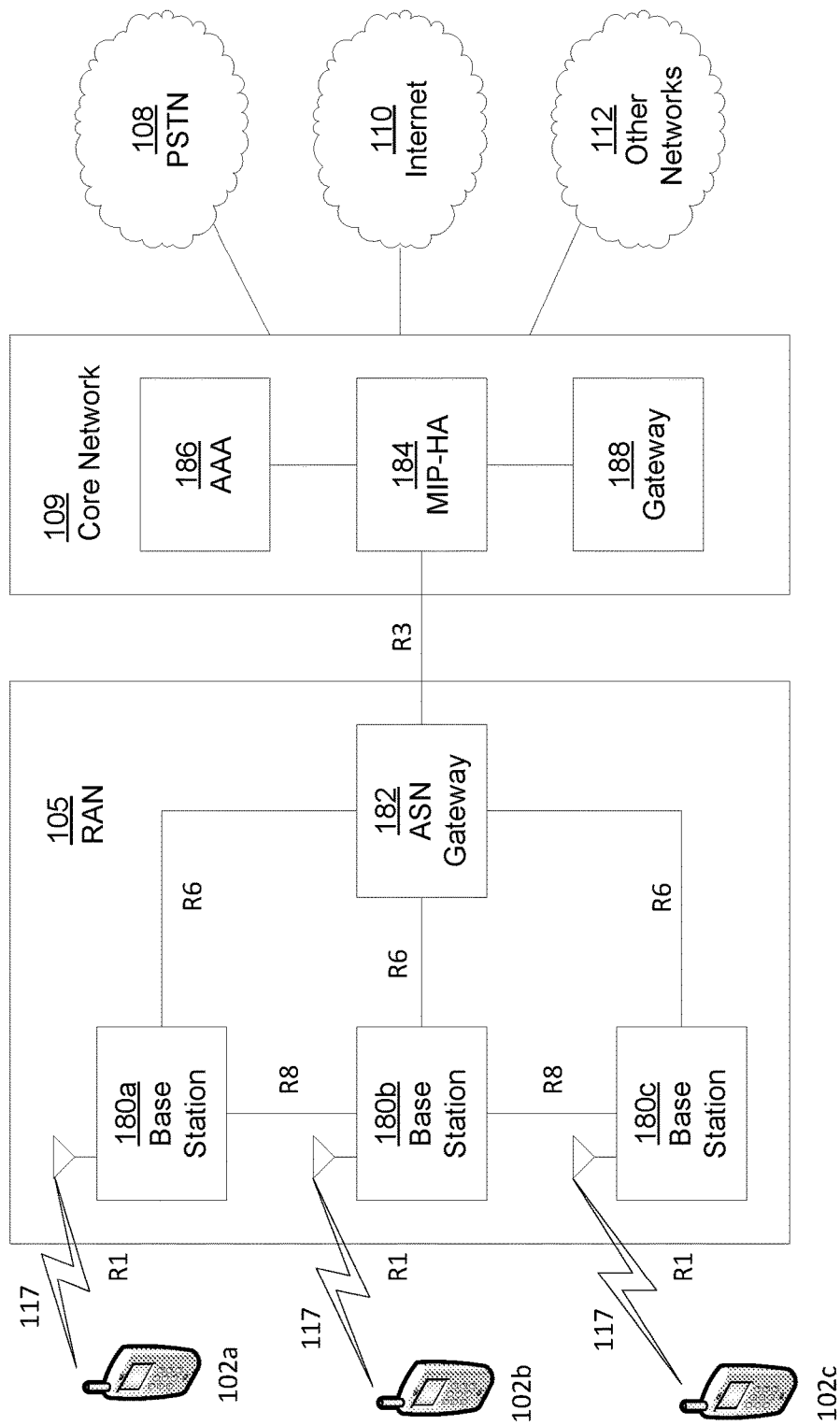
FIG. 1E is a system diagram of an example radio access network and an example core network that may be used in a communications system.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, for example handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, for example the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, for example the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In view of FIGS. 1A-1E, and the corresponding description of FIGS. 1A-1E, one or more, or all, of the functions described herein with regard to one or more of: WTRU 102a-d, Base Station 114a-b, Node B 140a-c, RNC 142a-b, MSC 146, SGSN 148, MGW 144, CGSN 150, eNode-B 160a-c, MME 162, Serving Gateway 164, PDN Gateway 166, Base Station 180a-c, ASN Gateway 182, AAA 186, MIP-HA 184, and/or Gateway 188, or the like, may be performed by one or more emulation devices (not shown) (e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

A WTRU may participate in WTRU-centric communications using one or more sets of WTRU-specific cell IDs (WCIDs). A WTRU may be configured with a WCID and/or one or sets of WCIDs, for example, by a serving cell and/or eNB, and/or by autonomous selection. A WTRU may be configured with, and/or may use, one or more WCIDs, for example, based on one or more of a resource, a channel, a subband, a time, a subframe, a signal type, a transmission type, a function (e.g. sequence generation), and/or service type, etc. A WTRU may indicate its presence by transmitting a WTRU presence indicator, e.g., to enable a network to send appropriate transmissions using one or more WTRU WCIDs. One or more resources for measurements and/or reporting, e.g., for channel state information (CSI) processes, may be (e.g., dynamically) controlled. A WTRU may be dynamically reconfigured (e.g. without radio resource control (RRC) transmissions) to adapt WTRU-centric communication to changing sets of one or more cooperating transmission points. A WTRU may have one or more, or multiple, sets of uplink (UL) power control parameters (e.g., per dynamically indicated resource and/or per WCID. A WTRU may (e.g., dynamically) indicate one or more sets (e.g. an optimal set) of points that may cooperate for the WTRU. A WTRU may request and/or trigger system information from one or more transmission points.

Coordinated Multiple Point Access (CoMP) may enable one or more, or multiple, cells and/or transmission points to cooperate in communications with a WTRU, e.g., transmitting and/or receiving data to and/or from a WTRU.

A channel state information (CSI) process may support transmission of data from one or more, or multiple, transmission points. A CSI Process may comprise a configuration with a reference signal (RS) resource (e.g. CSI-RS) for a desired signal and/or a reference resource for interference measurements (e.g. CSI-IM). A CSI-IM may be a set of resource elements (REs) on which a WTRU may take measurements. Measured and/or received power (e.g. any received power) may be considered interference. For example, CSI-IM resources may be configured similarly to zero power CSI-RS.

Measurements taken for a CSI Process may be transmitted, for example, in a periodic feedback configuration assigned to a CSI Process and/or may be triggered to be reported in an aperiodic feedback report.

Some CSI Processes may be considered reference processes to one or more other CSI Processes. Reference status may, for example, be based on a type of measurement, e.g., rank indicator (RI). For example, a WTRU may have a first CSI Process that is configured with a second CSI Process as a reference process for RI. An RI obtained for the second CSI Process may be reported in the first CSI Process instance(s).

Transmission points may share a (e.g. a single) cell-specific reference signal (CRS) resource. A CRS may or might not be transmitted by one or more, or all, transmission points. Quasi-co-location may support proper reception and/or estimation of a CSI-RS and/or a demodulation reference signal (DM-RS). Quasi co-location may enable a network to indicate, e.g., in a dynamic manner, reference signals (e.g. CRS, CSI-RS and/or DM-RS) that may be considered quasi-co-located and/or may assume the same Doppler shift, Doppler spread, delay spread and/or average delay.

Virtual cell IDs may support UL transmissions to one or more, or multiple, points, and/or to reduce UL interference to neighboring points. Virtual cell IDs may be dynamically indicated to a WTRU, e.g., to modify the sequence generation of a physical uplink control channel (PUCCH) and/or uplink (UL) DM-RS for a physical uplink shared channel (PUSCH).

Cooperation between a large number of transmission points, reception points and/or cells may be utilized to achieve the throughput gains promised by the ultra-densification of networks. Load balancing may involve rapid changes in optimal cooperating sets. Even low mobility in ultra-dense networks (UDN) may lead to large reconfigurations of cooperating sets for WTRUs and/or large amounts of signaling to enable handovers.

In WTRU-centric transmission, a (e.g. one or more, or each) WTRU may be served by a set of transmission and/or reception points where the set may be WTRU-specific. A transmission point set may be adapted dynamically without requiring (e.g. some amount and/or a large amount of) reconfiguration signaling. Stated somewhat differently, the techniques described herein may provide for an (e.g. optimal) set of transmission points per WTRU to be adapted dynamically and/or maintained without requiring what may be perhaps large amounts of configuration and/or reconfiguration signaling. The described techniques may provide for an elimination and/or reduction in configuration and/or reconfiguration reference signals (e.g. for measurement reporting and/or for demodulation). The described techniques may provide for an elimination and/or reduction in reconfiguring of CSI reporting, for example to support multiple transmission hypotheses. The described techniques may provide for WTRU-specific transmission of system information.

WTRU-specific transmissions may be achieved, for example, by configuring a WTRU to report measurements on one or more, or all transmission points in an area. However, such reporting may have unnecessarily large feedback overhead, e.g., when one or more, or multiple WTRUs share similar transmission and/or reception points. Feedback overhead may use an excessive amount of resources, reduce system throughput and/or consume WTRU battery life.

Dynamically adaptable WTRU-specific transmissions may be supported with low-impact (re)configuration signaling and feedback.

Figure 2:
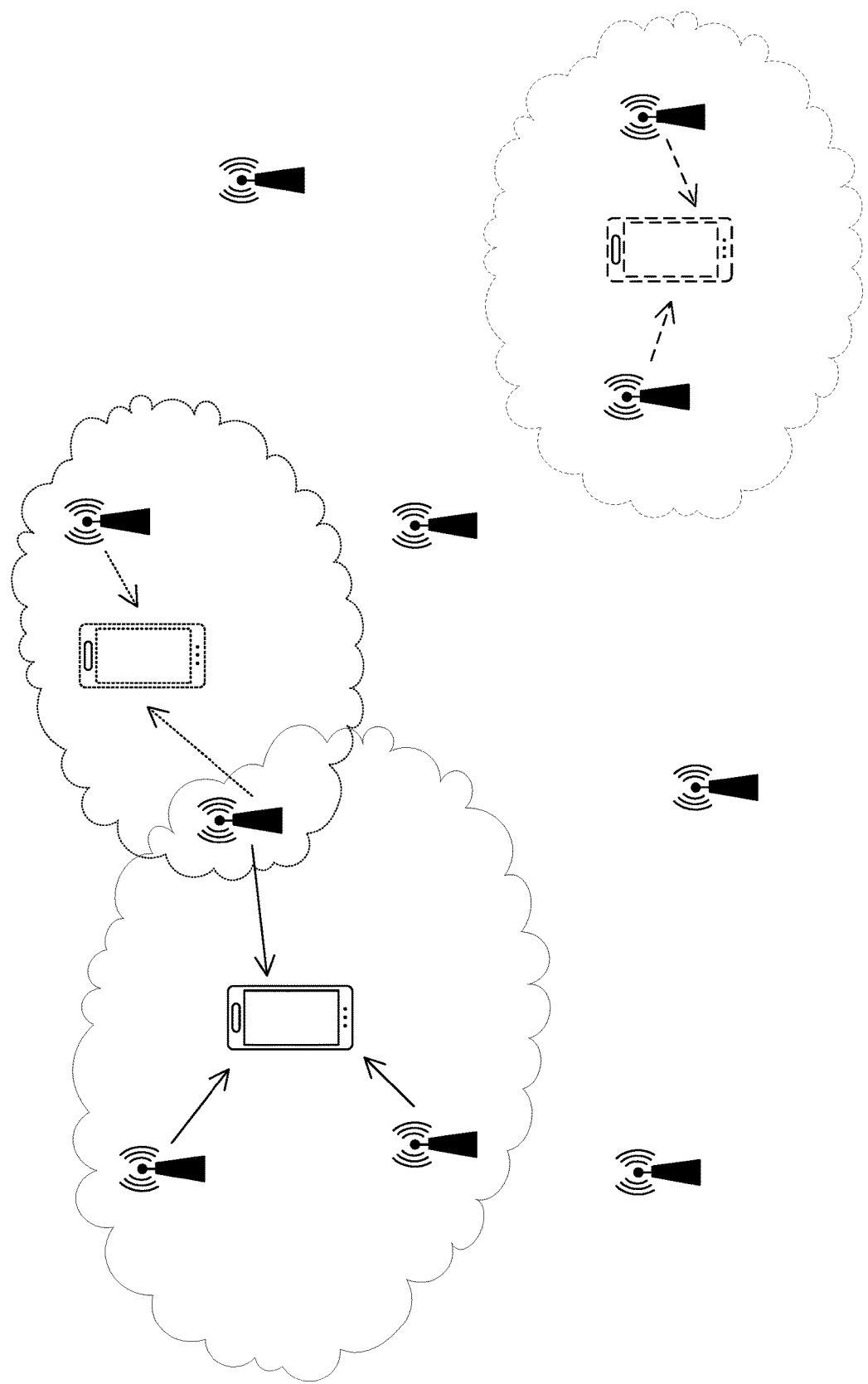
FIG. 2 is an example of WTRU-centric transmission point sets.

FIG. 2 is an example of WTRU-centric transmission point sets. A WTRU may be served by a set of transmission points. A set may be, e.g., an entity that is, WTRU-specific. In the example shown in FIG. 2, three WTRUs are served by different sets of transmission points, where some of the sets have overlapping transmission points.

A transmission point and/or cell may be part of more than one set. For example, a first WTRU may be served by a single transmission point and/or a second WTRU may be served by a set of one or more, or multiple transmission points, one of which may be the same transmission point serving the first WTRU.

A set (of transmission points) may form a virtual cell, e.g., in the sense that the composition of the set may be unknown at the WTRU. A WTRU may be unaware of the number and/or identity of component transmission points (and/or cells) forming a set of transmission points.

A WTRU may receive from and/or transmit to any subset of transmission points within a set. A set may be composed of a set of antenna ports that may receive and/or transmit data for a WTRU.

Figure 3:
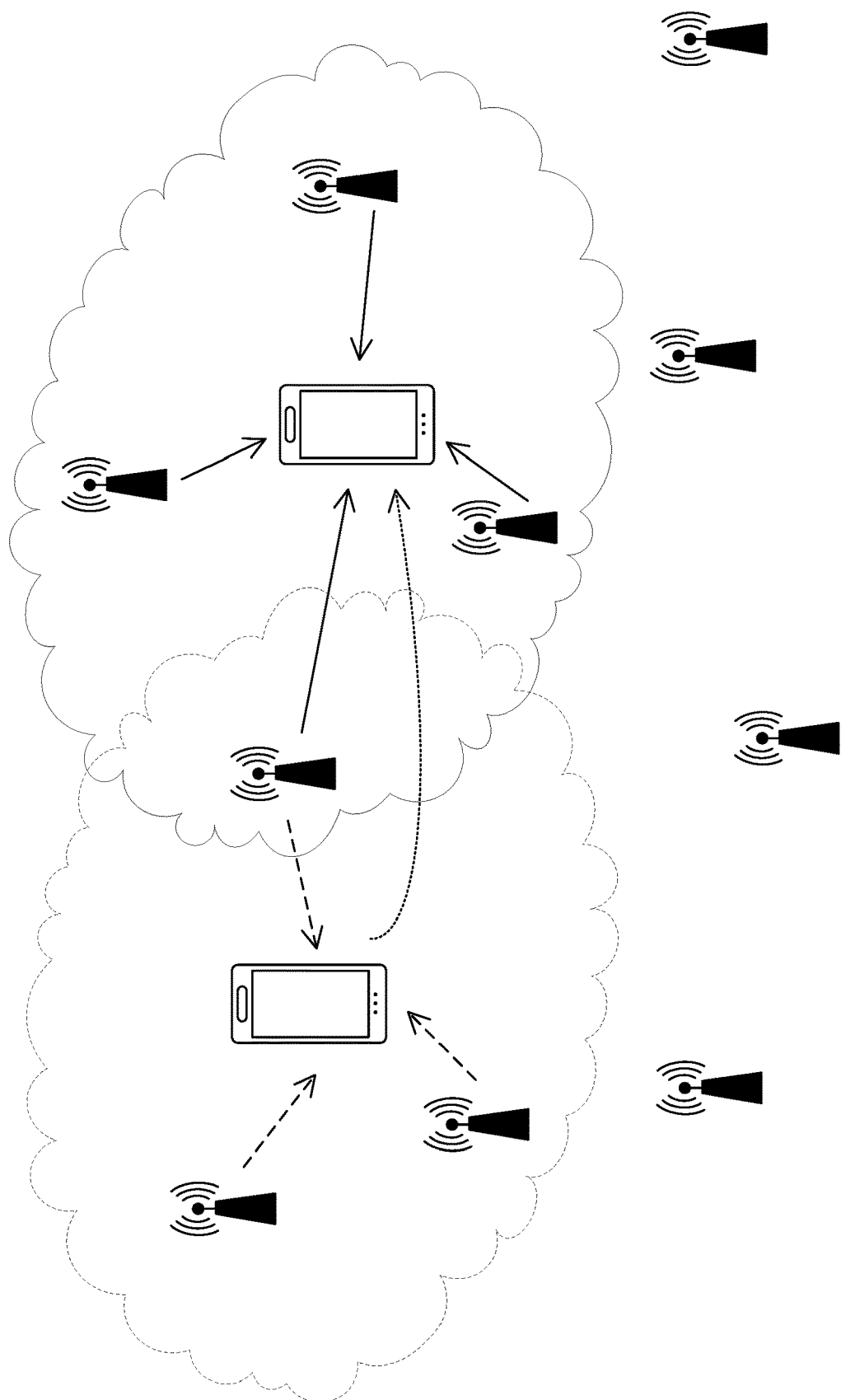
FIG. 3 is an example of WTRU-centric transmission set adaptation.
Figure 4:
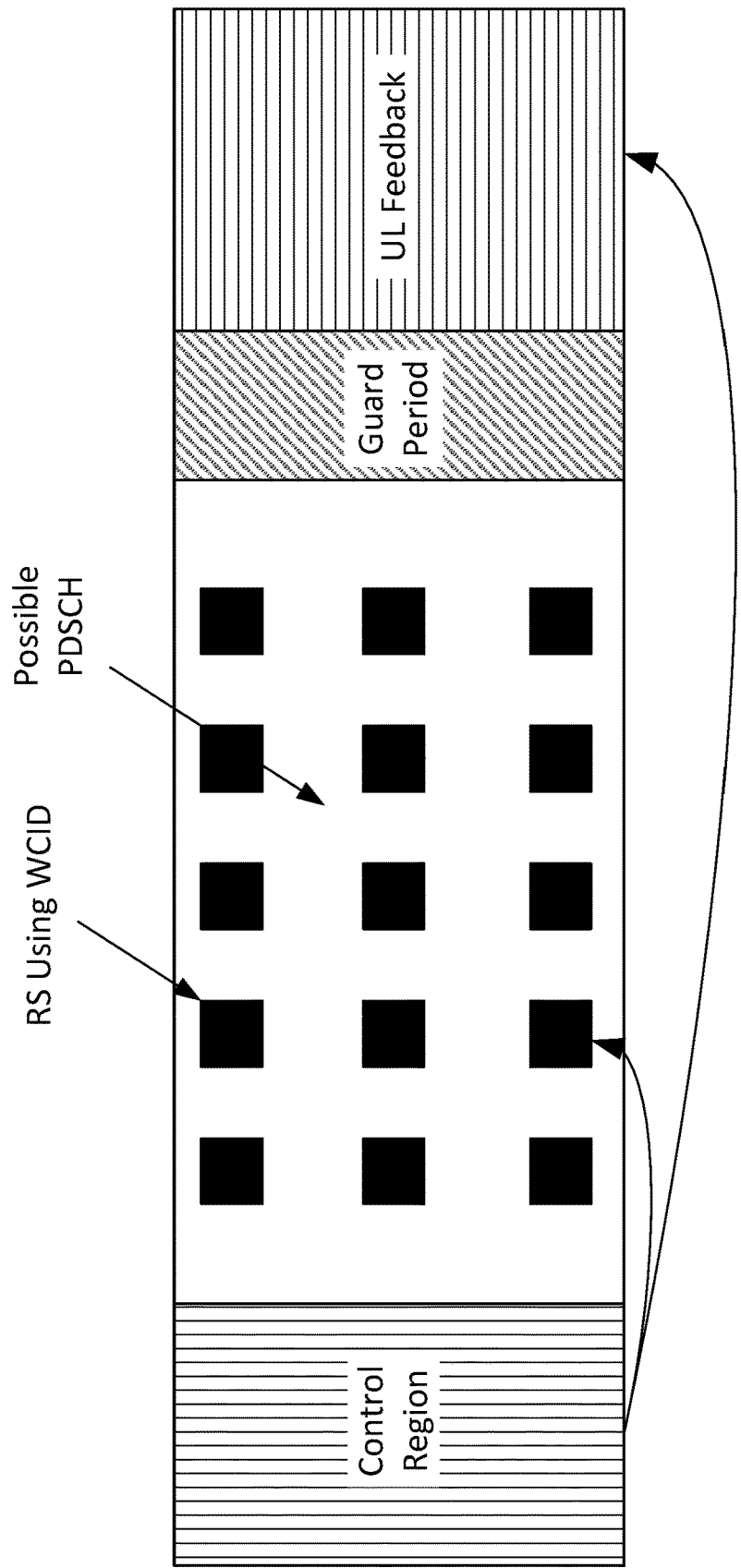
FIG. 4 is an example of a self-contained subframe assigning measurement and/or feedback resources.

FIG. 3 is an example of WTRU-centric transmission set adaptation, e.g., for a mobile WTRU moving from one area to another. A WTRU's set of transmission points may be adapted dynamically. Adaptation may occur transparently to a WTRU. A set of transmission points may adapt for a variety of factors, (e.g. WTRU mobility, network and/or transmission point status) and/or reasons (e.g. balancing loads, ensuring appropriate service for one or more WTRUs). FIG. 4 is an example of a self-contained subframe assigning measurement and/or feedback resources.

WTRU-specific IDs (e.g. WTRU-specific cell IDs and/or WCIDs) may be assigned, associated and/or used, for example, based on resources used, functions such as sequence generation, transmission types, different channels, etc.

Cell-specific IDs may be used and/or may be modified at a WTRU for reference signals, e.g., via virtual cell ID.

A WTRU may be configured with an ID, e.g., a WTRU-specific Cell ID (WCID). For example, a WTRU may be configured with a WCID by another serving cell and/or eNB (e.g. a Pcell and/or MeNB). A WTRU may autonomously select a WCID from an output of a function of the cell ID of another serving cell and/or eNB (e.g. a Pcell and/or MeNB) serving the WTRU.

A WTRU may (e.g., autonomously) select a WCID based on one or more factors and/or rules. For example, a broadcast message may indicate a set of available WCIDs to be used within a zone, where a WTRU may be served by any set of one or more transmission points within the zone. A WTRU may (e.g., autonomously) select and/or determine a WCID from an output of a function of a previous WCID configured for (and/or selected by) the WTRU. A WTRU may indicate its WCID to a network, for example, when a WTRU autonomously selects a WCID. A WTRU may indicate to a serving cell (e.g. using dedicated resources) the WTRUs WCID, for example, when the WTRU is configured with a WCID by another serving cell (e.g. a Pcell and/or MeNB). A WTRU may indicate its WCID in a first transmission to a transmission point. A transmission specifying a WCID may use resources indicated in a broadcast message from the transmission point.

A WCID may be used, e.g., as a basis, for one or more (e.g. all) transmissions to and/or from transmission/reception points in a set. A WCID may be used, for example, for one or more of: sequence generation of a synchronization channel (e.g. PSS/SSS); resources used for a synchronization channel; sequence generation for reference signals, such as higher-layer measurement reference signal (e.g. CRS), channel state information reference signal (e.g. CSI-RS), demodulation reference signal (e.g. DM-RS), positioning reference signal (e.g. PRS), UL demodulation reference signal (e.g. UL DM-RS), sounding reference signal (e.g. SRS), and/or a reference signal to support D2D and/or V2x; resources used for a reference signal; scrambling of a UL and/or DL channel data and/or control channel (e.g. PDSCH, PDCCH, E-PDCCH, PUCCH and/or PUSCH), and/or a channel to support D2D and/or V2x; and/or resources used for a UL and/or DL channel.

A WTRU may be associated and/or configured with, and/or may select, one or more, or multiple (e.g. a set of) WCIDs, which may result in one or more, or multiple WCIDs per WTRU. For example, a set of WCIDs may be configured individually, e.g., using a configuration procedure described herein to configure a single WCID. For example, a WTRU may (e.g., autonomously) select a set of WCIDs, e.g., using a procedure described herein to autonomously select a single WCID. For example, a WTRU may determine a set of WCIDs based on a configuration (and/or selection) of a first WCID. For example, a WTRU may be configured by a serving cell with a first WCID and/or, e.g., using a pre-determined function, the WTRU may obtain the set of WCIDs.

For example, a (e.g., one or more, or each) WCID in a set of WCIDs may be applicable to a subset of channels and/or signals, e.g., as described in foregoing examples.

For example, there may be a WCID for one or more, or each reference signal type and/or one or more, or each channel.

For example, there may be a WCID to support UL transmissions. There may be (e.g. in addition) a DL measurement report and/or feedback for a UL transmission. There may be a WCID to support DL transmissions. There may be (e.g. in addition) a UL measurement report and/or feedback to support a DL transmission.

For example, there may be a WCID per type of transmission. For example, the user plane may use a first WCID and/or the control plane may use a second WCID.

For example, there may be a WCID per subframe. For example, there may be subframe sets, where one or more, or each set may be associated with a different WCID. A transmission (e.g. one or more, or all transmissions) within a subframe may use the WCID associated with the subframe.

For example, there may be a WCID per subband, a WCID per carrier, and/or a WCID per frequency band.

For example, there may be a WCID per service type. For example, a service deemed ultra-reliable may use a first WCID, whereas a non-ultra-reliable and/or less reliable service may use a second WCID. For example, a service deemed low latency may use a first WCID. A service deemed non-low latency may use a second WCID.

A WTRU may transmit a presence indicator, e.g., to enable a network to send appropriate transmissions using the WTRU's WCID. One or more, or multiple, WTRUs may indicate presence at same time, which may result in collisions. A WTRU may transmit, for example, upon entering a zone where transmissions are WTRU-specific.

A WTRU may perform measurements on cell-specific transmissions and/or may detect broadcast information. A WTRU may select a cell with which it may perform random access, e.g., based on measurements.

A WTRU entering, being activated in, and/or exiting IDLE mode in a zone and/or area with one or more, or multiple transmission points might not be able to receive transmissions. For example, the WTRU might not have a WCID and/or its WCID might be unknown to the transmission points. A WTRU may transmit a message that may include a presence indicator. The message and/or the presence indicator may comprise (e.g. include) a WCID. For example, a WTRU presence indicator may comprise and/or use a previously configured and/or selected WCID (e.g. a last used WCID).

For example, a presence indicator may be transmitted on resources dedicated for such transmissions. For example, a WTRU may determine the appropriate resources to use (e.g. to transmit a presence indicator) based on a broadcast message from one or more transmission points.

For example, a presence indicator may be an SRS-like transmission, e.g., on a single symbol using part of or all of the UL bandwidth. A transmission may explicitly and/or implicitly indicate a WCID. For example, one or more WTRU WCIDs may be indicated to a receiving cell by a sequence and/or resources used for an SRS-like transmission.

For example, a cell may autonomously determine a set of WCIDs being used and/or to be used by a WTRU. A determination about a set may be made, for example, based on a received single WCID, e.g., when a relationship between a first WCID and other WCIDs is known. A WTRU may be requested, e.g., by a cell, to provide remaining WCIDs in a set. A request may be received by a WTRU in a transmission using the first WCID.

For example, a WTRU might not have a WCID to indicate to a cell, but may wish to be configured with one or more WCIDs. A WTRU may receive information (e.g. broadcast information) from a cell providing resources that the WTRU may use to indicate its presence to the network. A WTRU may use such resources for a UL transmission to indicate a request for WCID configuration. For example, a WTRU may perform random access to a cell with an indication that it requests a WCID. The indication may be explicit and/or implicit, such as a set of random access resources and/or parameters that may be used to indicate that a WTRU requests a WCID.

A WTRU may transmit a presence indicator, for example, when one or more events occur/conditions exist, such as when a WTRU is unable to detect cell-specific transmissions (e.g. cell-specific reference signals); when a WTRU is unable to detect a WCID-specific transmission (e.g. WTRU-specific reference signal); when a WTRU detects transmissions using a WCID other than the one related to the WTRU; when a WTRU is attempting to select a new cell and/or transmission point, possibly on a new frequency; when a WTRU requests system information; when an indication has been provided to a WTRU by another cell to transmit the presence indicator; when a WTRU has not received an expected transmission using one of its WCIDs; when a WTRU wishes to indicate to a neighbor cell that it is being interfered with; in a first WTRU transmission after acquiring an unlicensed channel; in a first WTRU transmission upon being powered on; and/or in a first WTRU transmission upon exiting IDLE mode.

A WTRU may receive from a cell and/or transmission point an acknowledgement that the cell and/or transmission point has received a presence indicator from the WTRU. The WTRU may implicitly determine such an acknowledgement, for example, by detecting the presence of broadcast information (e.g. system information). For example, system information may indicate resources to be used by the WTRU to begin transmissions. For example no WCID may be indicated in the presence indicator. A cell may indicate resources on which a WTRU may begin the process of being assigned a WCID.

A WTRU may provide a WCID in a presence indication. A WTRU may receive acknowledgement of reception of the WTRU presence indication from a cell. An indication and/or acknowledgement may be in a transmission on WTRU-dedicated resources using the WCID.

A WTRU may retransmit a presence indication, for example, when a WTRU has not received an acknowledgement of reception of presence indication within a predetermined and/or pre-configured time. A WTRU may attempt connection to another cell, which may occur with a process using a cell ID.

Collision handling may avoid and/or handle collisions that may occur, such as when one or more, or multiple WTRUs attempt to indicate their presence on colliding resources (e.g. without using unique WCID identifiers). One or more, or multiple, presence indications may lead to confusion at the cell in terms of total number of WTRUs that have indicated their presence. It may be unclear how many WTRUs to configure and/or an assumption may be inaccurate, e.g., given that one or more, or multiple WTRUs may assume the same WCID is assigned to them. For example a WTRU may transmit a presence indicator without a WCID. The WTRU may expect a transmission from a cell using cell-specific ID. A presence indication may be provided explicitly and/or implicitly (e.g. by parameters of the presence indicator obtained as outputs to a function of the WCID).

Resources and/or resource parameters that a WTRU may perform measurements on and/or use to report such measurements may be dynamically controlled.

WTRU-centric operation may be supported, for example, by monitoring a potentially large number of potential transmission points. A WTRU may be configured in a dynamic manner, e.g., to measure different sets of points, spanning potential combinations.

A WTRU may be configured to measure on dynamically indicated resources and/or provide feedback on other dynamically indicated resources, potentially in the same subframe.

A WTRU may have event-triggered CSI feedback, for example, to enable maintenance of a possibly large amount of transmission hypotheses, perhaps for example without the associated increase in feedback transmissions.

A WTRU may have a set (e.g. a limited set) of CSI Processes tied to reporting resources. CSI Processes and/or reporting resources may be configured and/or reconfigured (e.g. for signaling overhead and/or adaptation latency), for example, to enable modification of a cooperation set.

A WTRU may be configured with CSI measurements and/or reporting for a set of transmission points. A WTRU may be able to adapt its measurements and/or feedback report dynamically, for example, to reduce signaling and/or (re)configuration of measurements, e.g., in the event the set of transmission points changes.

A WTRU may be configured with a set of CSI Processes. A CSI process may be composed of one or more resources on which to measure one or more desired signals (e.g. CSI-RS) and/or one or more resource(s) to measure interference (e.g. CSI-IM). One or more parameters of a resource may comprise, for example one or more of: a WCID; subframe timing (e.g. periodicity and/or offset); resources within a subframe; a quasi co-location assumption (e.g. reference resource(s) a WTRU may assume is (are) quasi-co-located with the configured resource); and/or transmission power (e.g. a ratio with respect to another transmission).

Configuration of CSI Processes may be independent of the configuration of feedback reports and/or feedback resources. A WTRU may be configured with feedback resources. A feedback resource may be configured with one or more of a WCID; a feedback resource ID; a subframe timing of a report (e.g. periodicity and/or offset); and/or feedback report type (e.g. subband and/or wideband: RI, CQI and/or PMI).

A total number of configured feedback resources may or might not be the same as the total number of configured CSI Processes.

A dynamic indication may be provided to a WTRU to perform measurements for one or more CSI Processes, e.g., for one or more feedback resources. A dynamic indication may enable a modification of one or more parameters of a CSI Process, e.g., from a pre-configured potential set. For example, a CSI Process may comprise a CSI-RS-like resource for desired signal measurements. A CSI-RS-like resource may comprise a WCID, e.g., to help determine the sequence. For example, a dynamic indication of a measurement may be made. A new (e.g., fresh, and/or previously unused) WCID may be included, which may be used for a single measurement instance, perhaps to overwrite a previous WCID for subsequent measurement instances, etc. For example, a CSI Process may be configured with one or more, or multiple possible resources on which to make interference measurements (e.g. one or more, or multiple CSI-IMs). A dynamic indication of measurements may indicate to a WTRU the appropriate CSI-IM resources to use for interference measurements.

A dynamic indication of CSI measurement may comprise a CSI Process ID and/or a feedback resource ID, which may indicate to a WTRU the resources on which to make the measurements, the type of measurement to make and/or the resource to be used to report the measurements. A dynamic indication may be valid for a single time instance, may be valid for a time period, which may or might not be indicated, and/or may be valid until further dynamic indication is received. For example, a dynamic indication may be provided to a WTRU to perform measurements on a first CSI Process and/or to report the measurements in a first feedback resource. A WTRU may continue reporting measurements taken on the first CSI Process in the first feedback resource, for example, until an indication is provided to the WTRU to drop the first feedback resource and/or until an indication is provided to the WTRU for a second CSI Process to use the first feedback resource.

A WTRU configured with a set of CSI Processes and/or a set of feedback resources may autonomously determine the appropriate CSI Process to be reported in a feedback resource.

A WTRU may determine what CSI feedback to map to one or more, or each resource reference. For example, a WTRU may be configured to map the top n CSI Processes using a pre-configured ranking process and/or algorithm, which may, for example, rank in order of highest to lowest CQI or lowest to highest interference. The order of ranked CSI feedback may map to the reference resources ordered by ID value. A WTRU may provide a CSI Process ID when reporting a CSI Process, which may be useful to an eNB unaware of a WTRU's ranking of CSI Processes. A WTRU may provide a ranking in a report, which may be provided less frequently than other measurement reports. A mapping of ranked CSI Process to periodic reporting configuration may be known to an eNB without a CSI Process ID in one or more, or all feedback reports.

An eNB may, for example dynamically, indicate to a WTRU when to re-rank CSI Processes. An eNB may, for example dynamically, indicate a new preferred ranking method.

A feedback resource may have a condition of use. A WTRU may determine from one or more conditions of use for one or more feedback resources the appropriate CSI Process measurements to report using one or more feedback resources. For example, a WTRU may be configured with one or more, or two CSI Processes and/or a single feedback resource. The feedback resource may have a condition that the WTRU may report measurements for the CSI Process with highest CQI. A WTRU may provide a CSI Process ID in the feedback report. For example, a new (e.g., fresh and/or previously unused) flag may be provided, e.g., when reporting a reporting type (e.g. RI). An eNB may know from the presence of the new flag that the report includes a CSI Process ID, the reporting type (e.g. RI) and/or other specified content associated with a new flag. A report may provide an indication about which condition(s) was/were met for the CSI Process to have been chosen for a feedback resource.

Figure 5:
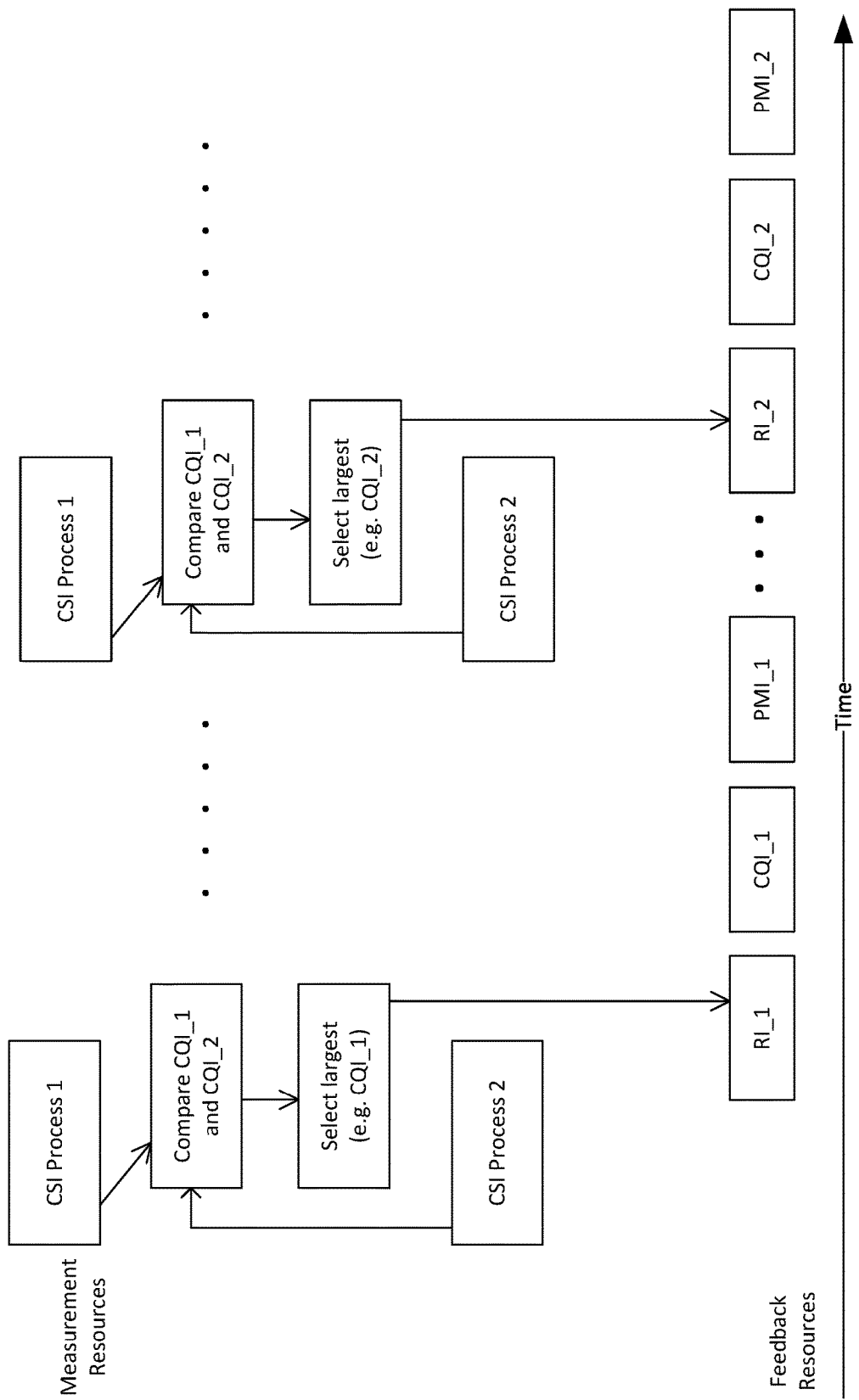
FIG. 5 is an example of a WTRU CSI Process feedback for one or more subsets of CSI Processes.

FIG. 5 is an example of a WTRU configured with a (e.g. single) set of feedback resources for a subset of CSI Processes. The WTRU may select the appropriate CSI Process' feedback reports for one or more, or each, feedback instance, perhaps for example based on one or more measurement criteria.

A WTRU may determine appropriate CSI Process(es) to feedback and/or to map to pre-configured feedback resource(s), for example, based on one or more conditions.

A condition may be one or more thresholds on feedback reports. For example, a WTRU may rank CSI Processes in terms of value of RI, CQI and/or interference measurement and/or may select (e.g. the top) n CSI Processes to map to appropriate feedback resources. For example, one or more CSI Processes that achieve RI, CQI, PMI and/or interference value threshold(s) may be considered a valid CSI Process to feedback. One or more thresholds may be absolute and/or may be relative to a measurement taken on another CSI Process. For example, a WTRU may report a measurement (e.g. one or more, or all, measurements of the CSI Process), for example, perhaps when a CQI measurement falls within a threshold offset of the maximum CQI.

A condition may be a total number of strongest interferers included in a CSI Process. A strongest interferer may be determined, for example, by an interference measurement that is greater than a pre-configured threshold. For example, a WTRU may feedback CSI Processes that have the fewest strongest interferers assumed as interference points.

A condition may be an identity of one or more strongest interferers. For example, a CSI Process that assumes the strongest interferers are (e.g. all) blanked may be chosen by a WTRU as a CSI Process to be fed back.

A condition may be a relationship between CSI Process feedback reports. For example, a WTRU may be configured with dependencies between CSI Process reports. A WTRU may report a first CSI Process, perhaps for example when a second CSI Process has reports that are dependent on the reports of the first CSI Process. For example, a second CSI Process may be configured to assume the same rank, subbands and/or precoder as a first CSI Process. A WTRU may or might not be configured to report the rank, subbands and/or precoder matrix of the second CSI Process. A WTRU may feed back the first CSI Process, for example, when the WTRU decides to feedback the second CSI Process.

A WTRU may bundle the reporting of one or more, or multiple CSI Processes. For example, one set of reporting instances may be used to report one or more, or multiple CSI Processes with similar report values. For example, a WTRU may indicate to an eNB that a first feedback resource may be used to report two different CSI Processes with a similar RI and/or CQI. A WTRU may report one or more, or multiple PMI and/or interference values within a feedback resource, e.g., one or more for one or more, or each, CSI Process.

A subframe may have one or more measurement resources and/or one or more feedback resources. For example, a WTRU may perform measurements on a set of symbols and/or subcarriers that may have a set of reference signals (e.g. CSI-RS, DM-RS and/or CSI-IM). A WTRU may (e.g. based on request and/or instruction in a first set of symbols and/or subcarriers) perform measurements in a second set of symbols and/or subcarriers of a same subframe as the first set of symbols and/or subcarriers or another (e.g. future) subframe.

An act performed by a WTRU described herein may be based on an indication (e.g. request and/or instruction) without expressly mentioning an indication. An indication (e.g. request and/or instruction), which may give rise to an act by a WTRU, may comprise, for example one or more of: one or more CSI Process(es) for which to make measurements; a parameter of the one or more CSI Process(es) that may be modified (e.g. WCID, and/or precoder information for a precoded reference signal); measurement(s) to perform; whether an indication is for a single instance of measurement(s) and/or report(s) and/or one or more, and/or multiple subsequent instances of measurements and/or reports and/or a specified time period; one or more feedback resource(s) and/or a feedback resource ID; and/or one or more reporting condition(s) that may need to be met for a WTRU to report the one or more measurements.

A (e.g. first) set of symbols and/or subcarriers that may include a measurement indication may be combined with control information assigning DL resources (and/or granting UL resources) for transmission, where transmission may occur within the same subframe.

A WTRU may use feedback resources mapped to a third set of symbols and/or subcarriers within the same subframe and/or in another (e.g. future) subframe. A WTRU may include the appropriate CSI Process ID(s) when reporting measurements, for example, when the WTRU may be configured with one or more, or multiple CSI Processes, one or more, or multiple measurements and/or reporting conditions.

A WTRU may be configured with one or more, or multiple CSI Processes and/or reporting resources to feedback CSI for at least some of the CSI Processes. Feedback may be periodic and/or aperiodic and/or may be triggered. A WTRU may be configured with periodic reporting instances for one or more, or multiple CSI reports such as RI, CQI, PMI and/or subband subset. Periodic reports may be transmitted by a WTRU in dedicated resources (e.g. PUCCH resources). A WTRU may have one or more, or multiple periodic feedback configurations, one or more (e.g. one or more, or each) of which may be composed of one or more, or multiple periodic feedback instances, e.g., to enable full reporting of one or more, or all CSI measurements for a CSI Process.

Periodic feedback configurations may or might not be associated with a singular and/or specific CSI Process. A periodic feedback configuration may have one or more reporting thresholds configured with it. A measurement and/or CSI Process may be fed back using a periodic feedback configuration, for example, when a CSI Process and/or a measurement of a CSI Process achieves the threshold. For example, a periodic reporting configuration may be configured with a threshold that states that a WTRU may report at least one of: RI, PMI, CQI, interference, and/or subband subsets in the appropriate feedback instances of the periodic reporting configuration, perhaps when a CQI is above a certain value (threshold).

Event-triggered CSI reporting may be used to report a measurement associated with a CSI Process that triggered the event, and/or may be used to report one or more (e.g. all possible) measurements associated with the CSI Process. A report may be based on report types configured within a periodic feedback configuration associated with a trigger. A WTRU may report a CSI Process ID in event-triggered reporting. A CSI process ID may be reported in a subset of reporting instances within a periodic reporting configuration. A reporting configuration may be based on the occurrence(s) of one or more trigger events and/or thresholds. A few of many potential triggers are provided as examples.

Figure 6:
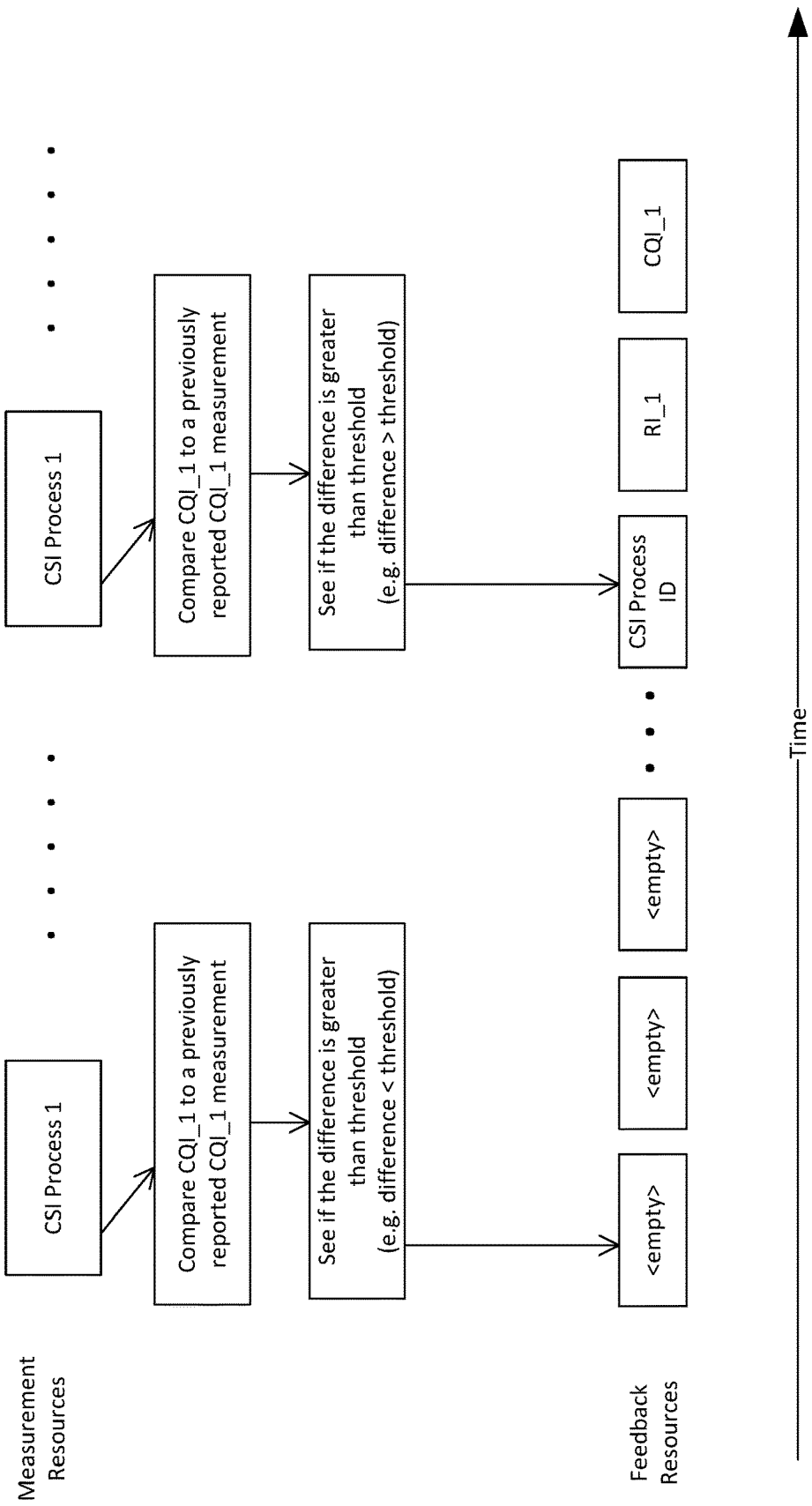
FIG. 6 is an example of event triggered WTRU CSI Process feedback.

For example, a trigger may be a measurement threshold. For example, a trigger may occur when one or more measurements (e.g. RI, CQI, and/or interference) obtained from resources configured by a CSI Process may rise above, and/or fall below a threshold value. FIG. 6 is an example of event triggered CSI feedback, where the event may be a difference between a current measurement and a previously reported measurement being greater than a threshold.

For example, a trigger may be a relative measurement threshold. For example, a trigger may occur when a measurement obtained from resources configured by a CSI Process have increased, and/or decreased, by a threshold amount over a previous measurement that may be of the same type (e.g. RI, CQI and/or interference). A comparison between measurements may be restricted in time. For example, a comparison between two measurements may be valid when (e.g. only when) both measurements occurred within a time period. A threshold may depend on the time elapsed between two measurements, which may increase the likelihood that a WTRU may report a measurement as the time elapsed since a previous report for that measurement and/or CSI Process increases. The previous measurement to which a current measurement may be compared may be one that was reported (e.g. a measurement that met reporting criteria) and/or not reported.

For example, a trigger may be a comparative measurement threshold between one or more, or multiple CSI Processes. A WTRU may be configured with one or more, or multiple CSI Processes and/or may trigger reports for CSI Processes whose measurement(s) (e.g. RI, CQI and/or interference) achieve a certain ranking threshold, e.g., when compared to the same type of measurement for other CSI Processes. A threshold may depend on a measurement obtained by a CSI Process currently using periodic feedback configurations. For example, a CSI Process may use a periodic reporting configuration to make a periodic report, for example, when RI and/or CQI of a competing CSI Process becomes larger (and/or smaller) than that of a CSI Process being currently fed back.

For example, a trigger may be a specific value of a measurement report associated with a CSI Process. For example, a WTRU may report CSI Process measurements when a CSI Process measurement returns a specific value, and/or a value that falls within a pre-configured set for RI, CQI, PMI, interference and/or subbands. In other words, the measured value may be substantially equal to a pre-configured and/or predetermined value.

For example, a trigger may be the time elapsed since a previous report. For example, a timer may be started when the measurements of a CSI Process trigger a feedback report. The timer may be reset when new measurements for the CSI Process are reported. A WTRU may report measurements associated with a CSI Process when a timer expires.

For example, a trigger may be one or more inter-CSI Process measurement dependencies. For example, a measurement from a first CSI Process may depend on the same type of measurement for a second CSI Process. For example, a second CSI Process may be triggered, possibly using the same periodic reporting configuration and/or a second periodic reporting configuration. For example, perhaps when a measurement report for a first CSI Process is triggered on a first periodic reporting configuration, a measurement report for a second CSI Process may be triggered on the first periodic reporting configuration and/or another periodic reporting configuration.

For example, a trigger may be a higher layer measurement threshold. For example, a WTRU may have one or more, or multiple CSI Processes, one or more of which may assume different transmission points for desired signal and/or interference. For example, a WTRU may make higher layer type measurements (e.g. RSRP, RSRQ and/or RSSI). These measurements may be compared to a threshold to determine what CSI Process may be fed back with a periodic reporting configuration. For example, a comparison may be performed by ranking higher layer measurements and/or determining the appropriate CSI Process based on the ranking.

A WTRU may dynamically indicate a set (e.g. an optimal set) of points that may cooperate for the WTRU. A more cooperative set may be based on higher layer measurements and/or reporting.

A WTRU may be configured with one or more resources on which to take higher layer measurements (e.g. received power measurements). A configuration may comprise, for example, one or more of: a measurement ID; a WCID; subframe timing (e.g. periodicity and/or offset); resources within a subframe; quasi co-location assumption (e.g., reference resource(s) that a WTRU may assume is (are) quasi-co-located with the configured resource); and/or transmission power (e.g. a ratio with respect to another transmission).

A WTRU may provide a measurement report (e.g. based on a periodic and/or aperiodic indication). A WTRU may report the measurement IDs of n references with the strongest higher layer received power. The value of n may be provided in a measurement report indication and/or may be determined by the WTRU, e.g., to enable the feedback of a measurement ID that satisfies a condition.

For example, a WTRU may report n measurement IDs whose resources provide a higher layer received power above and/or below a threshold value.

For example, a WTRU may report n measurement IDs whose resources provide a higher layer received power within and/or outside a threshold value of the maximum received power.

For example, a WTRU may rank the measured higher layer received power of a (e.g. one or more, or each) resource. The set of n measurements may comprise references whose higher layer received power is within a threshold value of the next highest and/or lowest measured higher layer received power.

A higher layer received power measurement may comprise, for example, one or more of: total received power on the reference resources; path loss determined as a function of the received power and/or the transmitted power; interference measured on the reference resources; and/or a ratio of total received power to interference measured on the reference resources. Reference resources used for total received power and/or the resources used for interference may be the same, orthogonal, and/or overlapping.

A WTRU may be configured to report its location and/or velocity, e.g., to aid an eNB in determining appropriate current set and/or future set. For example, a WTRU may report its location based on GPS measurements and/or based on received power from a set of pre-determined transmission points.

An autonomous WTRU transmission (e.g. a WTRU presence indicator) and/or a configured WTRU UL transmission, which may have a WCID, may be used on a network, e.g., to determine an appropriate set of transmission points to serve the WTRU.

UL power control parameters may depend on a dynamically indicated resource.

For example, a WTRU may assume that reception point UL power might not change substantially among transmissions. For example, a WTRU may assume pathloss is tied to a cell-specific measurement.

A WTRU may maintain a set of UL power control parameters, e.g., per reference resource and/or per WCID. A set of power control parameters may comprise, for example, one or more of: a pathloss value; expected received power; and/or accumulated closed-loop power commands (e.g. TPC command).

A pathloss value may be determined from a measurement on a reference resource. A WTRU may autonomously update a pathloss value. For example, a WTRU may update a pathloss measurement when a parameter of the reference resource is changed (e.g. the WCID). A WTRU may continue making pathloss measurements and/or may use the most recent measurement. An eNB may indicate to a WTRU to change its pathloss measurement(s) for one or more reference resource.

A WTRU may select an appropriate set of UL power control parameters, for example, for a UL transmission, e.g., whether to transmit UL data and/or in support of DL transmissions, such as a measurement report and/or HARQ A/N feedback.

Selection of an appropriate set of UL power control (UL PC) parameters may, for example, be performed by selecting a set of UL PC parameters tied to a reference resource indicated in control information triggering the UL transmission. For example, a UL transmission may include transmission of UL demodulation reference signals using a (e.g. specific) WCID. A WTRU may determine an appropriate set of UL PC parameters, for example, based on the WCID used for UL demodulation reference signals.

Selection of an appropriate set of UL power control (UL PC) parameters may, for example, be performed by selecting a set of UL PC parameters tied to a reference resource indicated in control information assigning DL resources. For example, a DL transmission may be triggered by DL control information that may comprise an explicit indication of a reference resource for UL feedback, which may be in the same subframe. A reference resource for UL feedback may be implicitly determined to be the same resource as that used for DL transmission. A WTRU may implicitly determine a reference resource for UL feedback from an indicated WCID, which may be the WCID used for DL transmission.

Selection of an appropriate set of UL power control (UL PC) parameters may, for example, be performed by selecting a set of UL PC parameters based on a selection made for another UL transmission in a (e.g. specific) subframe. For example, a WTRU may be configured with subframe subsets. For example, the same UL PC parameters may be used in one or more, or multiple (e.g. one or more, or each) subframe subset. For example, a WTRU may have one or more, or multiple UL transmissions in a single subframe. A first UL transmission may be explicitly configured with a set of UL PC parameters while a second UL transmission in the same subframe may reuse the same UL PC parameters as the first UL transmission.

Transmission points may broadcast system information. A WTRU may request (e.g., demand) system information from a cell. Demand capability may be an addition and/or an alternative to periodic broadcasting of system information by a cell and/or reliance of system information on cell-specific reference resources.

For example, system information may be broadcast regularly, e.g., when a cell is ON. A WTRU may detect system information broadcasts, e.g., when it may detect cell-specific reference resources.

Transmission points may reduce their energy consumption and/or interference, for example, by not periodically broadcasting system information. System information may be aperiodically broadcast depending on broadcast criteria, such as one or more of: a pre-determined period of time has elapsed, e.g., since a previous broadcast of system information; a neighboring transmission point broadcasts its system information; and/or system information changes. A WTRU may expect broadcast system information, for example, when one or more broadcast criteria are satisfied.

Broadcasts may be triggered. A WTRU may trigger a transmission point to transmit its system information. For example, a WTRU may transmit a UL signal (e.g. a WTRU presence indicator) as a system information trigger. A UL signal may explicitly and/or implicitly ask receiving points to transmit system information. For example, a WTRU may explicitly demand system information. A UL transmission may comprise a flag for on-demand system information. For example, a WTRU may implicitly ask for system information. A UL transmission itself may be perceived to implicitly request system information.

System information triggered by a WTRU may be broadcast and/or transmitted on dedicated resources, e.g. for an individual WTRU and/or for a group of WTRUs.

System information transmission resources may be an output of a function and/or a parameter of a system information trigger. For example, the timing of system information may be determined based on the timing of a system information trigger. For example, the PRBs (and/or subband) in which the system information may be transmitted may be determined based on the PRBs (and/or subband) where the system information trigger was transmitted. For example, a WCID used and/or indicated in the system information trigger may be reused (e.g., and/or translated) into a WCID used for the transmission of the system information.

System information transmission resources may be pre-determined. For example, a WTRU may expect system information that it triggers to be transmitted on pre-determined resources, which may be periodic resources.

A transmission point, e.g., one that is not triggered to transmit system information, may transmit information, e.g., a subset of the system information, periodically. For example, a transmission point may have periodic resources in which it may transmit system information. A transmission point may transmit information, e.g. unconditionally and/or conditionally, such as at the end of a period in which a WTRU did not trigger the transmission point to transmit full system information. A transmission point may use resources to transmit information, e.g., reduced system information, which may be composed of an indication of presence. Information (e.g. reduced system information) may enable a WTRU to determine that it may send a system information triggering message. Information (e.g. reduced system information) may comprise an indication of timing for the next non-triggered Information (e.g. full system information) transmission.

Systems, methods, and/or instrumentalities are contemplated for WTRU-Centric Transmission. A WTRU may communicate using a set of WTRU-specific cell IDs (WCIDs). A WTRU may be configured with a WCID and/or set of WCIDs, for example, by a serving cell and/or eNB and/or by autonomous selection. A WTRU may be configured with and/or may use one or more WCIDs, for example, based on a resource, channel, subband, time, subframe, signal type, transmission type, function (e.g. sequence generation), service type, etc. A WTRU may indicate its presence by transmitting a WTRU presence indicator, e.g., to enable a network to send appropriate transmissions using one or more WTRU WCIDs. Resources for measurements and/or reporting, e.g., for channel state information (CSI) processes, may be dynamically controlled. A WTRU may be dynamically reconfigured (e.g. without radio resource control (RRC) transmissions) to adapt WTRU-centric communication to changing sets of cooperating transmission points. A WTRU may have one or more, or multiple sets of uplink (UL) power control parameters, e.g., per dynamically indicated resource and/or per WCID. A WTRU may dynamically indicate a set (e.g. an optimal set) of points that may cooperate for the WTRU. A WTRU may request and/or trigger system information from a transmission point.

Although features and/or elements are described above in particular combinations, one of ordinary skill in the art will appreciate that one or more, or each feature and/or element may be used alone and/or in any combination with the other features and/or elements. In addition, the methods described herein may be implemented in a computer program, software, and/or firmware incorporated in a computer-readable medium for execution by a computer and/or processor. Examples of computer-readable media include electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as internal hard disks and/or removable disks, magneto-optical media, optical media such as CD-ROM disks, and/or digital versatile disks (DVDs). A processor in association with software may be used to implement a radio frequency transceiver for use in a WTRU, WTRU, terminal, base station, RNC, and/or any host computer.

What is claimed is:

1. A wireless transmit/receive unit (WTRU), comprising:
a memory;
a processor, the processor configured at least to:
  detect one or more transmission points within a communication range of the WTRU;
  determine at least one WTRU-specific cell identifier (WCID) based on detecting the one or more transmission points;
  determine one or more resources via which to indicate the at least one WCID;
  determine an occurrence of at least one condition; and
  initiate a transmission upon the occurrence of the at least one condition, the transmission indicating the at least one WCID; and
a transceiver, the transceiver configured at least to:
  send the transmission using the one or more resources.

2. The WTRU of claim 1, wherein the processor is further configured such that the transmission indicates the at least one WCID in at least one of: an explicit indication, or an implicit indication.

3. The WTRU of claim 2, wherein the implicit indication of the WCID includes at least one of: indicating the WCID by a sequence, or indicating the WCID by the one or more resources.

4. The WTRU of claim 1, wherein the processor is further configured to determine the WCID based on at least one of: a previously configured WCID, or a previously selected WCID.

5. The WTRU of claim 1, wherein the transceiver is further configured to receive at least one broadcast message from at least one of the one or more transmission points.

6. The WTRU of claim 5, wherein the processor is further configured to determine the one or more resources based on the at least one broadcast message.

7. The WTRU of claim 1, wherein the transceiver is further configured such that a presence indicator is sent on a single symbol in the transmission.

8. The WTRU of claim 7, wherein the transceiver is further configured such that the single symbol consumes at least one of: a part of the uplink (UL) bandwidth, or all of the UL bandwidth.

9. The WTRU of claim 1, wherein the at least one condition includes at least one of: a determination of an inability to detect a cell-specific transmission; a determination of an inability to detect a WCID-specific transmission; a detection of a transmission including a WCID unrelated to the WTRU; a determination to select a new transmission point; a determination to request system information; a receipt of a request to transmit the at least one WCID; a determination that an expected transmission using a WCID related to the WTRU has not been received; a determination to indicate interference; a first WTRU transmission after acquiring an unlicensed channel; a first WTRU transmission upon being powered on; or a first WTRU transmission upon exiting an IDLE mode.

10. The WTRU of claim 1, wherein the processor is further configured such that the at least one WCID is one WCID of a set of WCIDs.

11. The WTRU of claim 10, wherein the transceiver is further configured to receive a request from at least one of the one or more transmission points for one or more other WCIDs of the set of WCIDs, the request including the at least one WCID.

12. The WTRU of claim 1, wherein the transmission includes a presence indicator.

13. The WTRU of claim 1, wherein the transceiver is further configured to receive an acknowledgement of receipt of the at least one WCID from at least one of the one or more transmission points.

14. The WTRU of claim 1, wherein the processor is further configured to imply an acknowledgement of receipt of the at least one WCID upon receipt of a transmission including the at least one WCID.

15. A method performed by a wireless transmit/receive unit (WTRU), the method comprising:

detecting one or more transmission points within a communication range of the WTRU;
determining at least one WTRU-specific cell identifier (WCID) based on detecting the one or more transmission points;
determining one or more resources via which to indicate the at least one WCID;
determining an occurrence of at least one condition; and
initiating a transmission upon the occurrence of the at least one condition, the transmission indicating the at least one WCID; and
sending the transmission using the one or more resources.

16. The method of claim 15, wherein the transmission indicates the at least one WCID in at least one of: an explicit indication, or an implicit indication, the implicit indication of the WCID including at least one of: an indication of the WCID by a sequence, or an indication of the WCID by the one or more resources.

17. The method of claim 15, further comprising at least one of:
determining the WCID based on at least one of: a previously configured WCID, or a previously selected WCID, or
implying an acknowledgement of receipt of the at least one WCID upon receipt of a transmission including the at least one WCID.

18. The method of claim 15, further comprising:
receiving at least one broadcast message from at least one of the one or more transmission points, and
determining the one or more resources based on the at least one broadcast message.

19. The method of claim 15, wherein a presence indicator is sent on a single symbol in the transmission, and the single symbol consumes at least one of: a part of the uplink (UL) bandwidth, or all of the UL bandwidth.

20. The method of claim 15, wherein the at least one condition includes at least one of: a determination of an inability to detect a cell-specific transmission; a determination of an inability to detect a WCID-specific transmission; a detection of a transmission including a WCID unrelated to the WTRU; a determination to select a new transmission point; a determination to request system information; a receipt of a request to transmit the at least one WCID; a determination that an expected transmission using a WCID related to the WTRU has not been received; a determination to indicate interference; a first WTRU transmission after acquiring an unlicensed channel; a first WTRU transmission upon being powered on; or a first WTRU transmission upon exiting an IDLE mode.

* * * * *